July 14, 1953 — R. A. POSCH — 2,645,097
THERMAL TOOTH TESTING INSTRUMENT
Filed Nov. 9, 1950 — 2 Sheets-Sheet 1

INVENTOR.
Rudolph A. Posch
BY
Fishburn & Mullendore
ATTORNEYS

July 14, 1953

R. A. POSCH 2,645,097

THERMAL TOOTH TESTING INSTRUMENT

Filed Nov. 9, 1950

INVENTOR.
Rudolph A. Posch
BY
Fishburn & Mullendore
ATTORNEYS

Patented July 14, 1953

2,645,097

UNITED STATES PATENT OFFICE 2,645,097

THERMAL TOOTH TESTING INSTRUMENT

Rudolph A. Posch, Kansas City, Mo., assignor to William F. Teague, Kansas City, Mo.

Application November 9, 1950, Serial No. 194,818

2 Claims. (Cl. 62—92)

This invention relates to instruments for use by the dental profession and the like for thermally testing teeth or other parts of the human and animal body, and more particularly to such an instrument utilizing refrigerant expansion for producing a low temperature localized in an applicator or contact device capable of being applied directly to the member under test for thermally testing vitality or condition thereof.

Teeth have been thermally tested by the dental profession employing electrically heated devices and also ice arranged in cones or other structure. Either hot or cold members held in contact with a tooth will cause the patient to react to the change of temperature if the nerve or pulp thereof have life. If the nerve or pulp of the tooth has no life, the reduced sensitivity of the tooth can be instantly detected by the failure of the patient to react to the change in temperature. Teeth are more sensitive to cold than to heat, therefore an instrument having a relatively low temperature area for contact with the tooth provides more accurate determination of the vitality of the tooth particularly in persons having low tooth sensitivity.

The objects of the present invention are to provide a thermal testing instrument including a refrigerant container in an easily manipulatable body which can be held and operated in one hand to control and apply a low temperature to an area to be chilled; to provide an instrument with a liquid or highly compressed gaseous refrigerant and adjustable controls therefor for localizing the evaporative chilling effect thereof in a contact device or other area to be refrigerated; to provide for exhaust of the refrigerant medium remotely of the contact device and outside of the patient's mouth; to provide an instrument with a contact device on a tube adjustably and removably mounted on a housing for facilitating use thereof; to provide an instrument for holding and conveying a refrigerating medium to a tooth contacting device for refrigerating same with complete protection to all persons from any hazards from the refrigerant; and to provide a safe, sanitary dental testing instrument which is positive and economical in operation and easily maneuvered for accurately testing the vitality of teeth.

In accomplishing these and other objects of the present invention, I have provided improved details of structure, the preferred forms of which are illustrated in the accompanying drawings, wherein.

Figure 1:
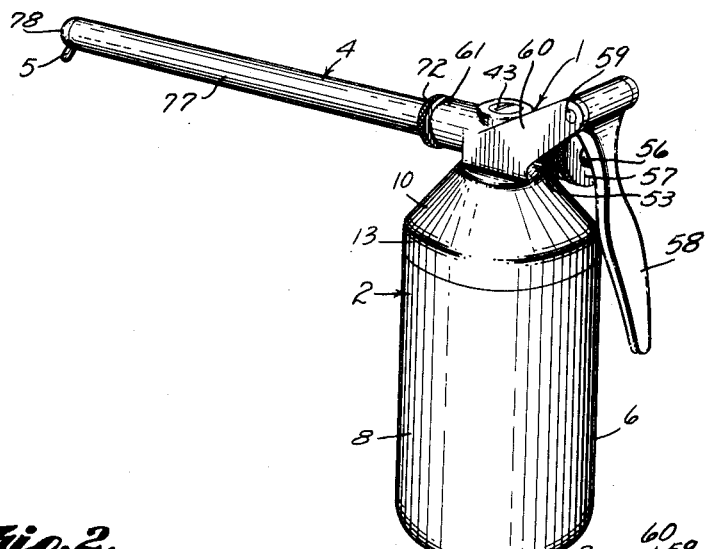
Fig. 1 is a perspective view of a dental testing instrument embodying the features of the present invention.

Referring more in detail to the drawings:

1 designates a thermal testing instrument which includes a housing 2 enclosing a suitable container of refrigerating media 3, and having suitable adjustable valve structure for controlling flow of said refrigerating media through an extension 4 to provide a localized, relatively low temperature in a tooth contacting tip 5 or other area to be chilled adjacent the end of said extension 4.

The housing 2 preferably consists of a cup 6 having a closed bottom 7, side walls 8 and an open upper end 9, said cup preferably being cylindrical and of such size that it may be easily grasped in the hand of a user and still have sufficient space on the inside thereof to receive a container 3 of refrigerating medium. The upper end of the walls 8 is arranged to be suitably removably connected to the lower end of a valve body 10, and in the illustrated structure screw threads 11 are provided on the upper end of the side walls 8 and engaged with threads 12 on a depending flange 13 of the valve body 10. The lower portion of the valve body is preferably recessed as at 14 to increase the size of the interior of the housing 2 for maximum capacity of refrigerant in a housing that can be easily grasped and handled in one hand of an operator.

The container 3 for the refrigerating medium is preferably formed of metal and of such construction that the refrigerating medium can be packaged therein for storage and said container placed bodily into the housing 2 when needed. The upper end of the container is suitably formed and the sheet metal thereof secured to a head member 15 to form a pressure-tight joint therewith. The head member extends from the container and has a threaded portion 16 terminating in a cylindrical shank 17 of reduced diameter, having an annular groove 18 for receiving a suitable seal ring 19, which sealingly engages the wall 20 formed by a bore 21 extending upwardly into the valve body 10 when the threaded portion 16 of the head 15 is engaged with a threaded counterbore 22 at the lower end of the bore 21 to form a pressure-tight joint between the container 3 and the valve body 10.

Figure 2:
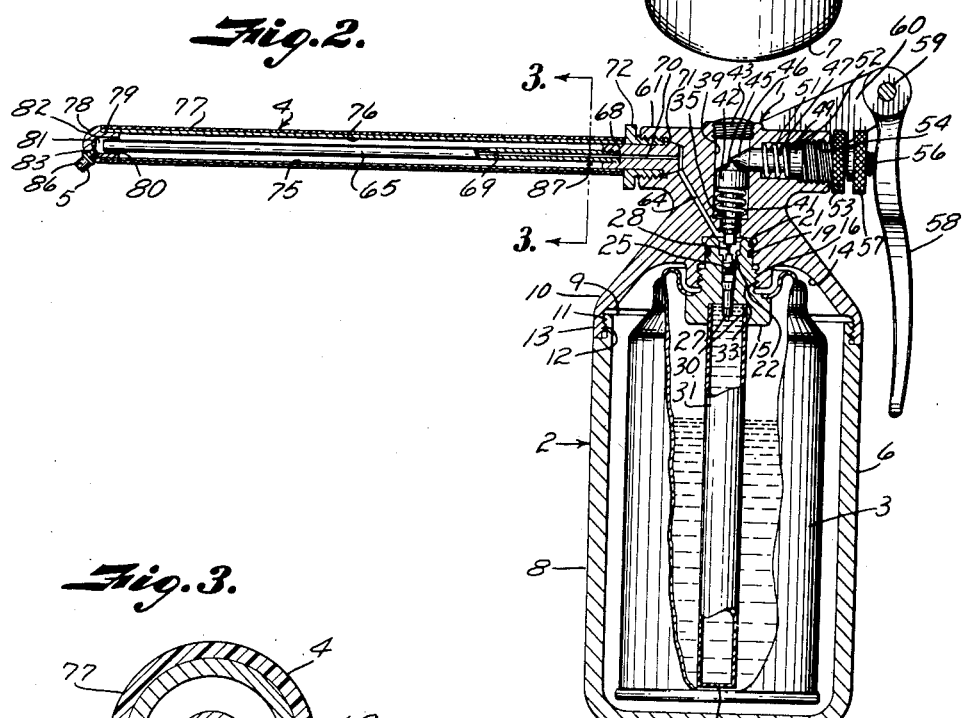
Fig. 2 is a longitudinal sectional view through the instrument.
Figure 3:
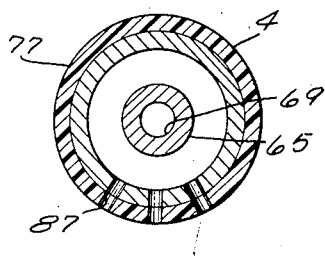
Fig. 3 is a transverse sectional view through the refrigerant tubes and exhaust ports therefor, on the line 3—3, Fig. 2.
Figure 4:
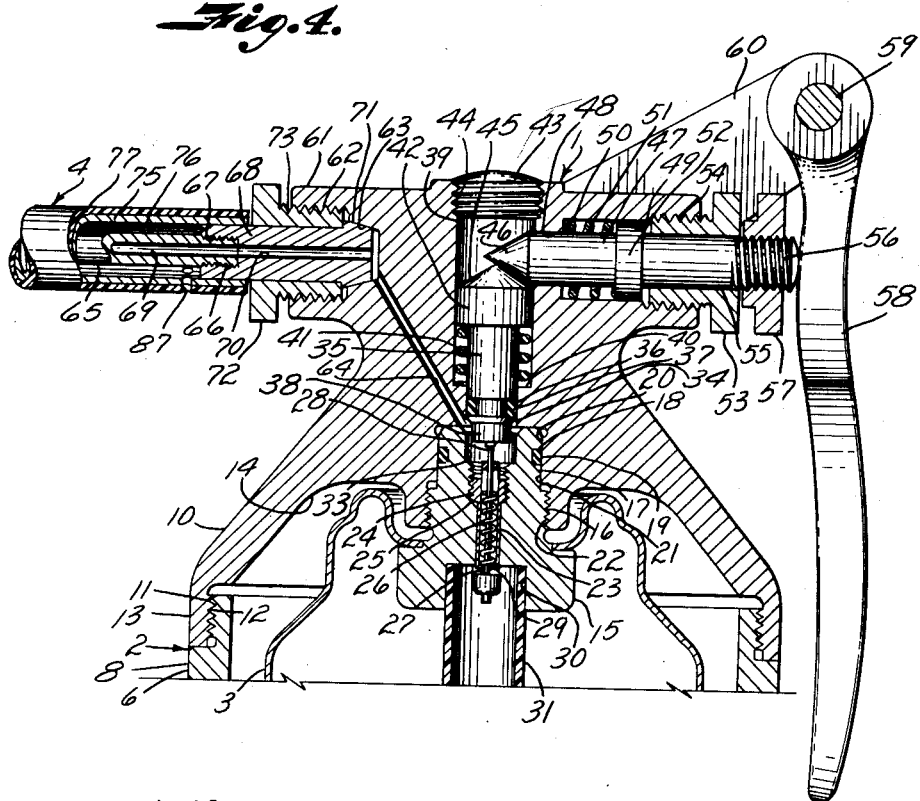
Fig. 4 is an enlarged detail sectional view through the upper portion of the refrigerant container and controls.

The head 15 has an axial bore 23 and a threaded counterbore 24 in which is secured a valve assembly 25, having a spring 26 for normally retaining a valve member 27 in closed position to prevent escape of refrigerating medium from the container 3, said valve being opened by pressure on a stem 28 toward the container to compress the spring 26 and move the valve member 27 away from its seat 29. The lower end of the head member 15 is provided with a counterbore 30 in which is fixed a tube 21 that extends to adjacent the bottom of the container, as illustrated in Fig. 2, and has an opening 32 at the lower end of the tube providing communication between the interior of the container 3 and the tube 31 which forms a passage for movement of refrigerating medium to the valve 27, and when said valve is in open position through the valve assembly for discharge from the container 3. The tube 31 also is relatively large in diameter to provide a supply of liquid refrigerant at the valve assembly when the housing is inverted and the container partially emptied. The supply of liquid is more than sufficient for testing a number of teeth.

The upper end of the head member 15 is preferably provided with a counterbore 33 which substantially registers with an axial bore 34 in the valve body, in which is slidably mounted a plunger 35 having a peripheral groove 36 containing a seal ring 37 for sealingly engaging the walls of the bore 34, the lower end of the plunger being provided with an extension 38 that extends into the counterbore 33 for engagement with the stem 28 for operation of the valve member 27.

Extending into the valve body 10 from the top thereof is a counterbore 39 which forms a shoulder 40 for seating one end of a spring 41 sleeved on the plunger 35, the other end of the spring being engaged with the lower end of an enlarged portion 42 of the plunger, said enlarged portion 42 slidably engaging the counterbore 39. The upper end of the counterbore is preferably closed by means of a plug 43 screwed into a threaded portion 44 of the counterbore 39. The upper end of the enlarged portion 42 of the plunger 35 is provided with a cam surface in the shape of a conical end 45 which engages a cam surface in the shape of a conical end 46 of a valve operating member 47 slidably mounted in a bore 48 that extends at right angles to the counterbore 39. The bore 48 is provided with a counterbore 49 extending from the exterior of the valve body and forming a shoulder 50 which is engaged by one end of a spring 51 sleeved on the plunger 47, the other end of said spring being engaged with a collar 52 on the plunger 47, the periphery of said collar being slidably engaged with the counterbore 49.

The spring 51 tends to retract the plunger 47 whereby the engagement of the conical ends 45 and 46 permits the spring 41 to effect retraction of the plunger 35 to a position where the valve member 27 is in closed position. Retraction of the plunger 47 is limited by engagement of the collar 52 with the end of a threaded sleeve nut 53 which is screwed into a threaded outer portion 54 of the counterbore 49, said sleeve nut having a through bore 55 through which the plunger 47 extends and is slidably engaged. The outer end of the plunger is provided with screw threads 56 to mount an adjusting nut 57 adapted to engage the end of the sleeve nut 53 to limit the opening movement of the plunger. Adjustment of the sleeve nut 53 and adjusting nut 57 positions the plungers 35 and 47 and limits movement thereof. The adjustment also provides a micrometer adjustment of flow of refrigerant upon operation of the plungers to open the valve. This is important as too much flow of refrigerant will freeze the instrument and too little flow will be ineffective in providing proper chilling from refrigerant evaporation. The plunger 49 is operated by a lever 58 pivotally mounted as at 59 on ears 60 extending outwardly from the valve body 10, whereby the pivot 59 is above the plunger 47 and the lever 58 extends downwardly alongside the upper portion of the cup 6.

A boss 61 extends from the valve body 10, preferably diametrically opposite from the portion of the valve body containing the plunger 47. The boss 61 is provided with a threaded socket 62 terminating in a tapered seat 63 with the inner end of the socket having communication through a duct 64 with the bore 34 and counterbore 33 for flow of refrigerating medium from the container 3 and through the duct 64 when the valve member 27 is in open position.

Figure 5:
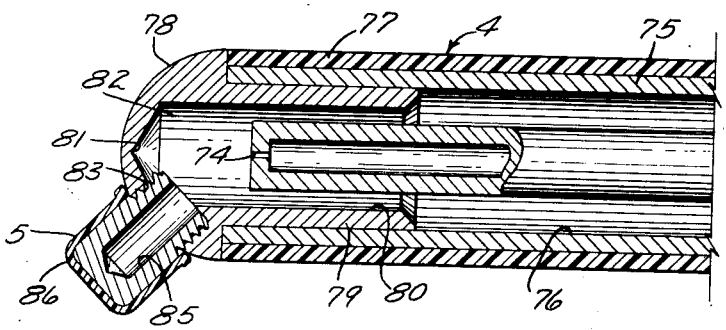
Fig. 5 is an enlarged detail sectional view through the refrigerant expansion chamber and tooth contacting tip.

The extension 4 is removably mounted in the socket 62 and consists of an orifice tube 65 having a threaded end 66 which is screwed into a threaded socket 67 at one end of a tube fitting 68, whereby the bore 69 of the orifice tube registers with a through bore 70 of the fitting. The other end of the fitting is provided with a head 71 having a tapered periphery corresponding to the tapered seat 63 to form a pressure-tight connection therebetween, the head 71 terminating short of the end of the socket 62 to provide communication between the bore 70 of the fitting and the duct 64 in the valve body 10. Sleeved on the periphery of the fitting 68 is a union nut 72 having an exterior thread 73 which fits the threaded socket 62 and is threaded therein whereby the end of the union nut engages the head 71 to removably hold same in seated condition on the seat 63. The structure also permits the extension to be rotated relative to the housing for selective angular adjustment of the tip 5. The end of the orifice tube 65 remote from the fitting 68 is provided with a very small orifice 74 which communicates with the bore 69 of the tube 65. A tube 75 having a bore 76 of larger diameter than the orifice tube 65 is preferably arranged concentrically with said orifice tube, one end of the tube 75 being sleeved over and secured to the orifice tube fitting 68, and terminating short of the union nut 72 to permit free rotation of said nut on the orifice fitting 68. A sheath 77 of plastic or other suitable material of low heat conductivity is sleeved on the tube 75 and is coextensive therewith for insulation purposes. The tube 75 and its sheath preferably extend slightly beyond the orifice end of the tube 65, as illustrated in Fig. 5, the end of said tube 75 being closed by a cap 78 preferably hemispherical in shape and of such size that the periphery forms a continuous surface with the outer surface of the sheath 77 to give a streamlined, attractive appearance.

The cap has an annular flange 79 which fits into the end of the tube 75 and is suitably secured thereto. The cap is provided with a concentric bore 80, larger in diameter than the orifice tube 65 and terminating short of the end of the cap as at 81 to form a chamber 82 having communication with the space between the tube 65 and tube 75, said chamber forming an expansion chamber for refrigerating medium discharged through the orifice 74. A threaded bore 83 is arranged in the cap preferably at an angle to the axis of the tube 65, and threaded into the bore 83 is a tooth contacting tip 5 of relatively high conductivity metal. Said tip preferably has a recess 85 extending therein and having communication with the expansion chamber 82. While the tip 5 may be used for directly contacting a tooth to be tested, it is preferable that a sheath 86 of plastic or resilient material cover the exposed surface of the tip, said sheath being removable and replaceable for each patient for sanitary purposes.

Expanded refrigerant passes from the expansion chamber through the space between the orifice tube 65 and tube 75, which space forms a low pressure duct, and is discharged through exhaust ports 87 extending through the tube 75 and sheath 77 adjacent the orifice tube fitting 68, whereby the refrigerant exhaust is exteriorly of a patient whose tooth is being examined.

In using an instrument constructed as described, the cup 6 is removed from the valve body and a refrigerant container 3 having suitable refrigerant media therein is applied to the valve body by screwing the extending portion of the head member 15 into the threaded bore 22, the seal ring 19 and screw threads forming a pressure-tight connection. The cup 6 is then reapplied to the valve body 10 to enclose a refrigerant container. Then when it is desired to thermally test a tooth or otherwise use the refrigerant, the dentist grasps the housing 2 in one hand and, using his thumb, presses the lever 58 moving the plunger 47 into the valve body whereby the conical end 46 forms a cam surface which cooperates with the conical end 45 to move the plunger 35 downwardly in the valve housing, whereby the end 38 of said plunger engages the valve stem 28 to move the valve member 27 downwardly into open position for flow of refrigerating medium from the container, through the tube 31, valve assembly 25, counterbore 33, duct 64, bores 70 and 69, and is discharged through the orifice 74 into the expansion chamber 82. The expansion of the refrigerant lowers the temperature in the expansion chamber and also lowers the temperature of the tooth contacting tip 5, expanded refrigerant flowing through the low pressure duct formed by the space between the tubes 65 and 75 and exhausting through the ports 87. Very little refrigerant is required to provide a very cold tooth contacting tip and the sleeve nut 53 and adjusting nut 57 are adjusted to provide suitable flow of refrigerant when the valve member 27 is in open position. The instrument is then manipulated to move the end of the extension 4 into the mouth of the patient, whereby the tip is applied to a tooth to be tested and the reaction of the patient will provide a dentist with desired information relative to the vitality of the tooth. The union nut may be loosened and the extension rotated to alter the position of the tip 5 to facilitate application to various teeth and the union nut retightened.

The release of pressure on the lever 58 permits the spring 51 to retract the plunger 47 whereby the spring 41 can retract the plunger 35, permitting the spring 26 to effect closure of the valve member 27 and stop flow of refrigerant through the instrument. After the teeth of a patient have been tested, the sheath 86 is removed and another sheath placed thereon. Also the entire extension 4 may be sterilized in any suitable manner. If it is desired to turn the tip 5 to a different relative position, the union nut 72 may be loosened and the entire extension rotated to position the contacting tip 5 as desired. The union nut is then tightened to maintain a pressure-tight connection with the valve body.

It is believed obvious that I have provided a thermal testing instrument which is economical, safe and efficient in use for accurately, thermally testing the vitality of teeth and otherwise utilizing the refrigerant.

What I claim and desire to secure by Letters Patent is:

1. A thermal tooth testing instrument comprising, a housing for holding a quantity of expansible refrigerating medium, said housing having passages therein for flow of refrigerating medium from the housing, valve means in the housing having means operative in the passages for obstructing discharge flow of refrigerating medium from the housing, means extending exteriorly of the housing and operatively engaged with the valve means for selectively operating same to effect discharge flow of refrigerating medium from the housing, an elongated tube having one open end and an orifice in the other end, said tube being mounted on the housing with the open end of said tube in communication with a passage in the housing for flow of refrigerating medium through the tube, a second tube concentric with and surrounding the first tube and spaced therefrom, said second tube having one end sealingly secured to the first tube adjacent the open end thereof, a cap closing the other end of the second tube and forming a chamber at the end of the first tube for receiving discharge of refrigerating medium from the orifice, said second tube having exhaust ports adjacent the end secured to the first tube, and a tip of high thermal conductivity extending from the cap at an angle to the axis of the tubes, said tip having an interior recess extending therein from the chamber whereby discharge of refrigerating medium through the orifice into the expansion chamber and interior recess of the tip permits expansion of the refrigerating medium and effects reduction of the temperature of the tip for contacting a tooth to be tested, said expanded refrigerating medium flowing between the tubes and through the exhaust ports.

2. A thermal tooth testing instrument comprising, a container for holding a quantity of expansible refrigerating medium, said container having a head member thereon with a passage in the head member for discharge of refrigerating medium therefrom, spring-loaded valve means normally maintaining the passage closed, a valve stem extending through the passage and adapted to be actuated exteriorly of the container for operating the valve, a housing enclosing the container, said housing having a portion sealingly engaging the head member, said housing portion having a pair of bores and a passage therein communicating with the passage in the head member, one of said bores extending to the exterior of the housing, a plunger slidably mounted in the other bore for engagement with the valve stem and movable to effect opening of the valve, a second plunger slidably mounted in said one bore and engaging the first-named plunger to operate same, micrometer adjusting means on the housing and engaging the second plunger for adjusting and limiting movement of said second plunger for regulating the opening of the valve and rate of flow of refrigerant therethrough, means exteriorly of the housing and having engagement with the second plunger and selectively operative to move the plungers and open the valve, an extension on the housing having a bore therein and an orifice in one end, said bore in said extension being in communication with the passage in the housing for flow of refrigerating medium through the orifice, a tubular member surrounding said extension and spaced therefrom, said tubular member having one end sealingly secured to said extension adjacent the housing, a cap closing the other end of the tubular member and forming a chamber at the end of the first tube for receiving discharge of refrigerating medium from the orifice, said tubular member having exhaust ports adjacent the end secured to the extension, and a tip of high thermal conductivity extending from the cap at an angle to the axis of the tubular member, said tip having an interior recess extending therein from the chamber whereby discharge of refrigerating medium through the orifice into the chamber and interior recess of the tip permits expansion of the refrigerating medium and effects reduction of the temperature of the tip for contacting a tooth to be tested, said expanded refrigerating medium flowing between the tubular member and extension and through the exhaust ports.

RUDOLPH A. POSCH.

References Cited in the file of this patent

UNITED STATES PATENTS

| Number | Name | Date |
| --- | --- | --- |
| 554,432 | Wigmore | Feb. 11, 1896 |
| 1,614,532 | Mobley | Jan. 18, 1927 |
| 1,935,973 | Altmann | Nov. 21, 1933 |
| 2,124,831 | Roos | July 26, 1938 |
| 2,305,367 | Webb | Dec. 15, 1942 |
| 2,418,036 | Lane | Mar. 25, 1947 |
| 2,536,001 | Chase | Dec. 26, 1950 |

FOREIGN PATENTS

| Number | Country | Date |
| --- | --- | --- |
| 580,216 | France | Aug. 25, 1924 |